(12) United States Patent
Herrmann et al.

(10) Patent No.: US 7,043,334 B2
(45) Date of Patent: May 9, 2006

(54) METHOD OF AND APPARATUS FOR OPERATING A WORK ROBOT

(75) Inventors: Guenter Herrmann, Guetersloh (DE); Oswin Moessner, Beelen (DE)

(73) Assignee: CLAAS Fertigungstechnik GmbH, Beelen ( * ) Notice: Subject to any disclaimer, the term of this patent is extended or adjusted under 35 U.S.C. 154(b) by 0 days.

(21) Appl. No.: 10/761,499

(22) Filed: Jan. 21, 2004

(65) Prior Publication Data

US 2004/0162625 A1    Aug. 19, 2004

(30) Foreign Application Priority Data

Jan. 22, 2003   (DE) ................. 103 02 592

(51) Int. Cl.
*G06F 19/00*   (2006.01)
*B25J 9/16*   (2006.01)

(52) U.S. Cl. ............. 700/192; 700/245; 700/254; 901/2

(58) Field of Classification Search ........... 700/159, 700/192, 245, 246, 254, 258; 900/2; 901/2

See application file for complete search history.

(56) References Cited

U.S. PATENT DOCUMENTS

| 4,831,549 | A | * | 5/1989 | Red et al. ................. 700/254 |
| 5,297,238 | A | * | 3/1994 | Wang et al. ............... 700/259 |
| 5,371,836 | A | * | 12/1994 | Mitomi et al. ............. 700/245 |
| 5,383,882 | A | * | 1/1995 | Buess et al. .............. 606/157 |
| 5,784,282 | A | * | 7/1998 | Abitbol et al. ............ 700/186 |
| 6,070,109 | A | * | 5/2000 | McGee et al. ............. 700/259 |

FOREIGN PATENT DOCUMENTS

| DE | 40 15 644 A1 | 11/1991 |
| DE | 41 15 846 A1 | 11/1992 |
| DE | 198 26 395 A1 | 12/1999 |
| DE | 198 21 873 C2 | 7/2000 |
| DE | 199 24 511 A1 | 12/2000 |
| DE | 01/00370 A1 | 1/2001 |
| DE | 101 33 624 A1 | 1/2002 |

* cited by examiner

*Primary Examiner*—Jayprakash N. Gandhi
(74) *Attorney, Agent, or Firm*—MIchael J. Striker

(57) ABSTRACT

For operating a positioning device of a multi-axes processing device having at least one processing for improving its positioning accuracy, a position change of the processing device and the associated processing head is controlled with a computer, work poses of the processing device and the associated processing head controlled by a computation and control unit of the processing device are detected, and the work poses are adjusted if necessary.

19 Claims, 2 Drawing Sheets

METHOD OF AND APPARATUS FOR OPERATING A WORK ROBOT

BACKGROUND OF THE INVENTION

The present invention relates to a method of and apparatus for operating a work robot.

More particularly, it relates to a method for improving the positioning accuracy of a multi-axes operating device, as well as to an apparatus for performing this method.

It is known from practice to provide processing devices, such as for example work robots which are driven into a corresponding work pose in a computerized manner. The disadvantage of such an adjustment of processing devices is that the positioning inaccuracies, caused for example by geometrical inaccuracies, transmission clearances and elasticity, are unavoidable. Such inaccuracies however must be avoided or at least approximately avoided when a high precision in the processing of workpieces is required.

SUMMARY OF THE INVENTION

Accordingly, it is an object of the present invention to provide a method and an apparatus for operating a work robot, which avoid the disadvantages of the prior art.

More particularly, it is an object of the present invention to provide a method of operating a work robot, with which it is possible to exactly adjust the work pose of robots by a computer, so as to eliminate the disadvantages of the prior art.

In keeping with these objects and with others which will become apparent hereinafter, one feature of the present invention resides, briefly stated in a method which has the steps of controlling a position change of the processing device and a processing head associated therewith with a computer; detecting work poses of the processing device and the associated processing head by a computation and control unit of the processing device; and post adjusting the work poses if necessary.

When the method is performed in accordance with the present invention, it has the advantage that gradually occurring deviations between the nominal variables to be reached by the processing device and the actual reached actual variables are tested in regular periods and in some cases can be post-adjusted, so that the work quality of the processing device remains approximately unchangeably high.

The testing and in some cases the post adjustment can be performed in a simple and arbitrarily frequently repeatable manner when the coordinates of the work region of the at least one processing head are compensated on reference coordinates of a calibration region.

In accordance with a further feature of the present invention, in order to be able to take into consideration longitudinal changes in directions x-y-z which are difficult to determine due to the great number of turning axes, the work region and the calibration region are arranged relative to one another so that the processing device and at least one processing head associated with it during running through the processing region and the calibration region assume substantially the same work pose. In this way an expensive software which takes into consideration length changes depending of the corresponding turning angles by means of a mathematical filter, is dispensed with.

In accordance with a further feature of the present invention, the coordinates of the work region in a co-moved coordinate system and reference coordinates of the calibration region for at least one work pose are defined in a stationary global coordinate system. Such an approach has first of all the advantage that the calibration region which receives the reference coordinates can be protected from environmental influences as well as temperature fluctuations, so that in a simple manner a change of the reference coordinates provided for calibration of the processing device can be avoided.

Since the coordinates of the work region and the reference coordinates of the calibration region are provided in the computer of the processing device, it is therefore in a simple manner guaranteed that additional control and regulating means can be dispensed with. In addition it has the advantage that the processing device on the one hand can assume its work poses in any positions in space and there corresponding handlings can be performed in accordance with the coordinates of the work region. On the other hand the coordinates of the work region and the reference coordinates in the calibration region can be determined simply with respect to one another without complicated software support.

With relatively constant outside conditions, it can be advantageous based on the regulation technique simplification when the calibration process is performed only in dependence on time in regular or irregular intervals. In connection with this, substantially only bearing clearance-dependent and transmission clearance-dependent inaccuracies are compensated. In accordance with an advantageous further embodiment of the invention, the calibration process can be performed also in dependence on a predetermined parameters such as for example time, temperature changes and impact loads. This is especially advantageous when the calibration process can be adjusted more precisely and faster to changing outer conditions, such as for example during temperature fluctuations or after collision-caused impact loads.

An important feature of the present invention is that the work region can include a plurality of work points and the calibration region represents a selection of these work points as reference points, whereby the work points which are not represented in the calibration region by reference points can be determined by interpolation in a computerized manner. This provides a special advantage for the invention, since complicated mathematical models can be dispensed with when the robot during the calibration assumes the same or similar poses as during work in the working region.

In an arrangement for improving the position accuracy in accordance with the present invention, the calibration region which represents the work region can be formed in a structurally simple manner by a caliber plate with a plurality of reference points, wherein the reference points can be also a selection of the work points defined in the work region. It is advantageous when the position of the caliber plate is adapted to the position of the work region in such a way that the processing device and the at least one processing head associated with it assume substantially the same work poses in the region of the caliber plate and the work region.

In case of alternating processing steps within a work pose of the processing device, it is advantageous when the reference points are applied on the caliber plate as a flat grid and the actual work coordinates of the processing device located between them are determined by interpolation, so that a gap-less representation of the total defined work region is obtained.

For positioning the caliber plate at a protected location so that the environmental factors (temperature, dirt, vibrations, etc.) which negatively influence the calibration surface can be substantially eliminated, the distance of the caliber plate to the work region in horizontal and/or vertical direction is changeable, wherein the relative position to the work pose of the processing device can be substantially maintained.

In accordance with a further advantageous embodiment of the present invention, the reference points of the caliber plate can be formed as openings or pins which are sensed by a sensor connected with a computer of the processing device. Alternatively, in a structurally simplified manner it is possible to form the reference points of the caliber plate as reflecting points which are sensed by a measuring sensor connected with the computer of the processing device.

In accordance with still a further feature of the present invention, an especially structurally simple solution is provided when the measuring sensor is a component of the work head of the processing device.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
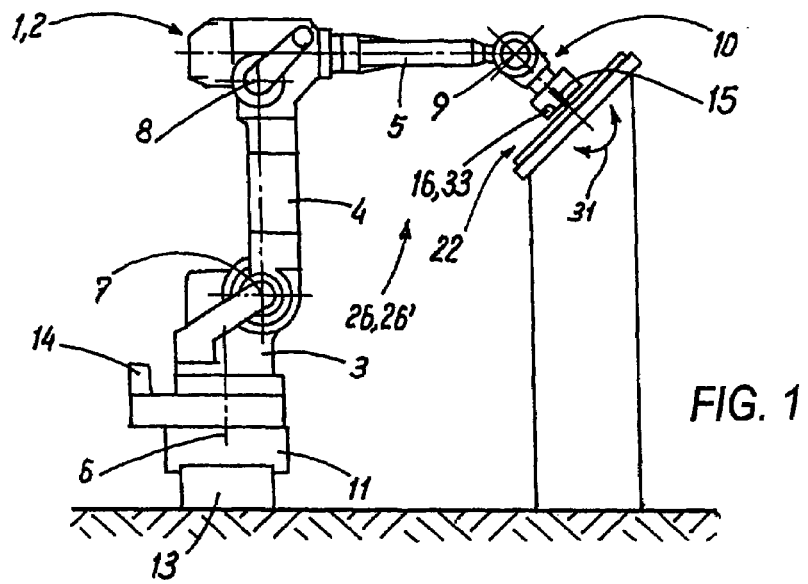
FIG. 1 is a front view of a work robot in accordance with the present invention.
Figure 3:
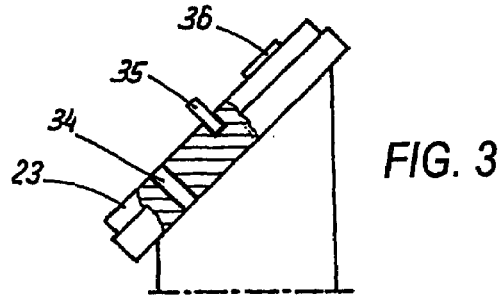
FIG. 3 is a view showing a detail of the work robot of FIG. 1, in accordance with the present invention.
Figure 2:
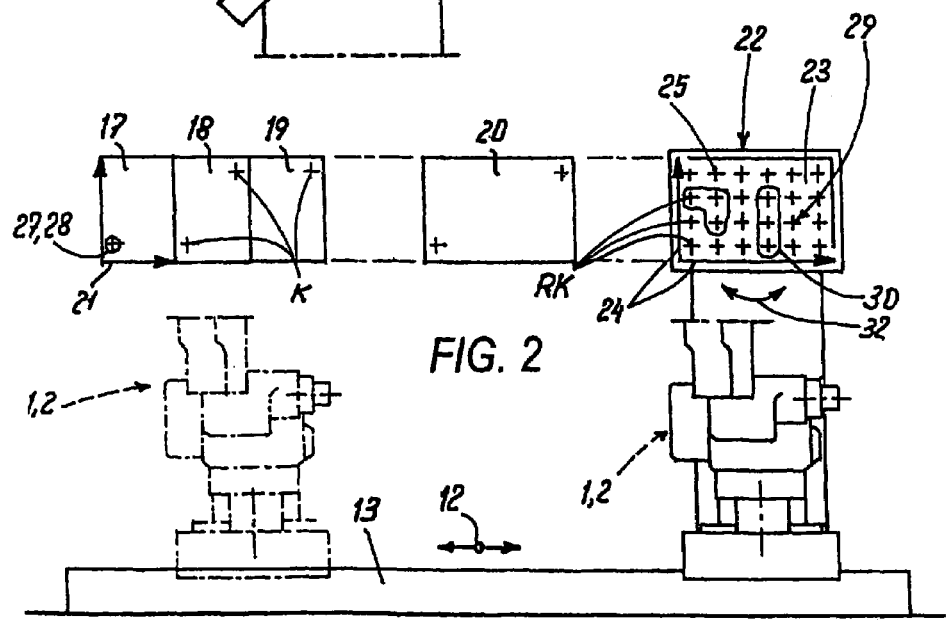
FIG. 2 is a side view of the work robot of FIG. 1 in accordance with the present invention.
Figure 4:
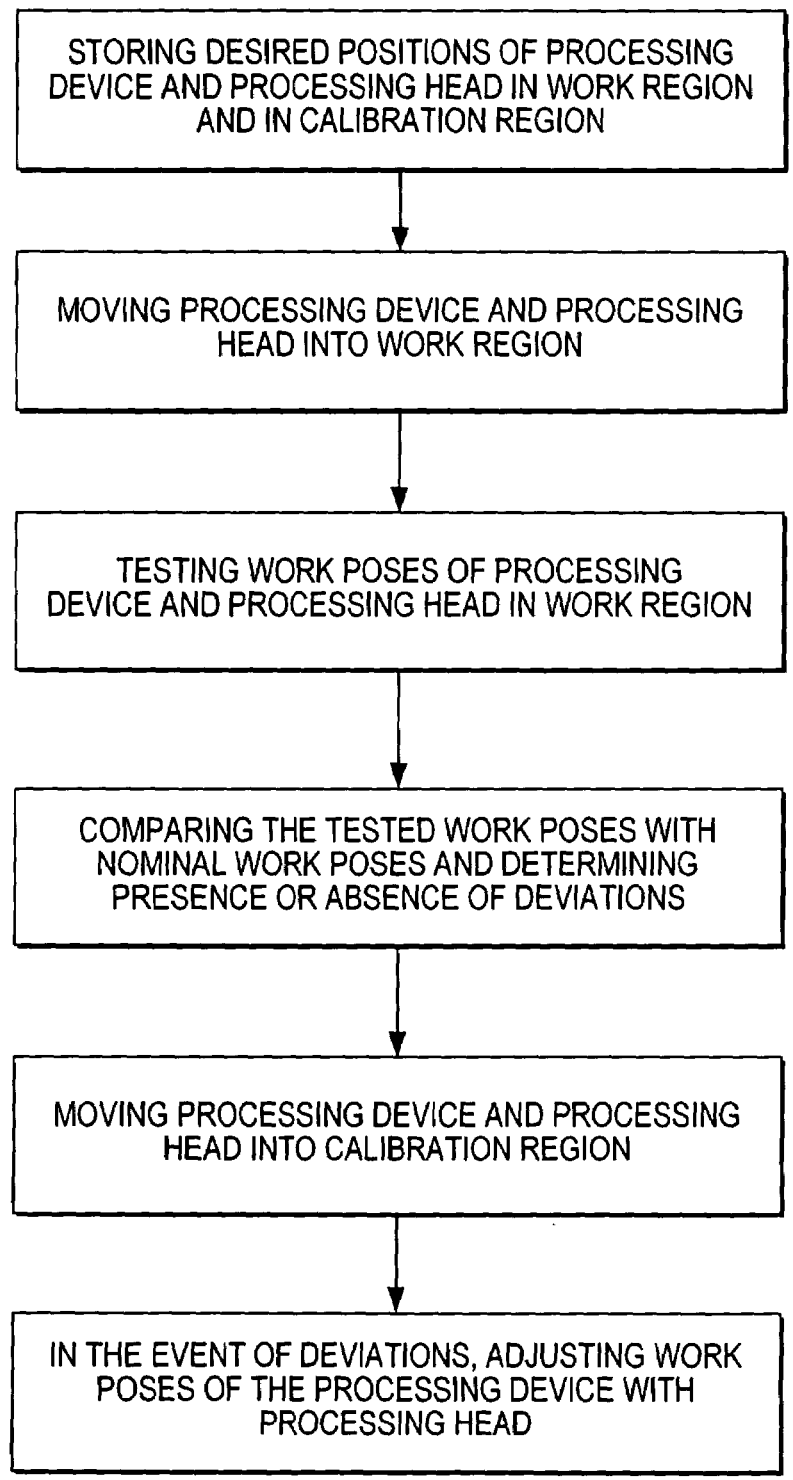

FIG. 1 illustrates a processing device 2 which is formed as a work robot 1. It has a plurality of segments 3, 4, 5, which form a work support and are movable in a known manner around a plurality of horizontal and vertical turning axes 6, 7, 8. At least one of the segments which form the work support carries a horizontal turning axis 9 on its front-side end. A processing head 10 is arranged on the segment 5 turnably about the horizontal turning axis 9. The work robot 1 is fixed at its lower side on a carriage 11 which is arranged displacably in direction of the arrow 12 on a carriage guide 13. The work robot 1 is provided in a known manner with a computation and control unit 14 which primarily performs the control of the different turning axes 6, 7, 8, 9 and the displacement of the work robot 1 along the carriage guide 13. In addition, a measuring system 16 which is formed in accordance with the present invention is associated with the processing head 10 in the region of a work unit 15 which can be formed for example as a drill.

The work robot 11 is displaceable along the carriage guide in one or several so-called work regions 17–20. In the simplest case, the work regions 17–20 are formed by workpiece surfaces to be processed, while the processing head 10 of the work robot 1 in these work regions 17–20 for example produces openings in the workpiece surfaces. For forming the openings at desired locations in the corresponding working regions 17–20 by the work unit 15 formed as a drill, these desired positions are stored as coordinates K of the work regions 17–20 in the computing and control unit 14. The coordinates K are identified on a coordinate system 21 which moves together and determines the corresponding work regions 17–20. Furthermore, the work robot 1 can move by the carriage guide 13 in a calibration region 22 which can be formed by a caliber plate 23. So called reference coordinates RK related to a stationary global coordinate system 24 are associated with the calibration region 22 and also can be stored in the computation and control unit 14.

The reference coordinates RK of the calibration region 22 in accordance with the present invention correspond to the coordinates K of the work region 17–20, wherein the former are drawn to a stationary global coordinate system 24 and the latter are drawn to co-moving coordinate system 21. Both the coordinates K of the co-moving coordinate system 21 and the reference coordinates RK can be either fictitiously selected reference points 25 of the work regions 17–20 in the calibration region 22, or directly concrete positions 27 for example of openings 28 introduced in the work piece surfaces. Since the processing device 2 formed as the work robot 1 is movable over the carriage guide 13 between the work regions 17–20 and the calibration region 22, with the computation and control unit 14 controlling these position changes, the processing device 2 and in particular the processing head 10 associated with it can cover both the work regions 17–20 and also calibration region 22.

Since the relevant coordinates K of the work regions 17–20 and the reference coordinates RK of the calibration region 22 are stored in the computation and control unit 14, the computation and control unit 14 can move the processing device 2 both in the work regions 17–20 and also in the calibration region 22 in accordance with the coordinates K of the work region 17–20 or the reference coordinates RK of the calibration region 22. Thereby, it is possible to drive the processing device 2 in accordance with the inventive method so that the work poses 26 of the processing device 2 and the processing head 10 associated with it can be tested and when necessary can be adjusted. This is especially important since due to different outside influences and different increase of movement deviations of the processing device 2 the coordinates K of the work regions 17–20 defined by the computation and control unit 14 can no longer be correctly controlled, so that for example openings produced in the workpiece can gradually deviate from their nominal positions.

The post adjustment of the processing device 2 is performed finally in such a manner that the work poses 26 which are controlled by the computation and control unit 14 in the work regions 17–20 in dependence on the corresponding coordinates K can be compared with the nominal work poses 26' determined by the reference coordinates RK of the calibration region 22, and when the actual poses 26 no longer correspond to the nominal work poses 26', they are post-adjusted in accordance with the nominal work poses 26'. For this purpose the processing device 2 is moved into the calibration region 22, in which the nominal work poses 26' determined by the reference coordinates RK are taken in and the coordinates K of the work regions 17–20 provided in the computation and control unit 14 are corrected in accordance with these reference coordinates RK, which finally corresponds to a post-adjustment of the actual work poses 26 of the processing device 2 and the processing head 10 associated with it.

In accordance with the shown embodiment of the invention, the calibration region 22 and the work regions 17–20 occupy the same or similar position in space, wherein this same position in accordance with the present position is limited to the inclination of the calibration region 22 and the work regions 17–20 in horizontal and vertical directions. It is thereby guaranteed that the processing device 2 and the processing head 10 associated with it assume during running through the working regions 17–20 and also during running the calibration region 22 the same work poses 26. For protecting the calibration region 22 from the disturbing environmental influences such as for example vibrations, temperature fluctuations, and dirtying, the calibration region 22, in deviation from the shown arrangement, can be displaced in vertical or horizontal directions relative to the work regions 17–20 but arranged approximately on the same inclination in horizontal and vertical directions. For designing the position of the work regions 17–20 flexible, the coordinates K of the work regions 17–20, as mentioned above, are defined in a co-moving coordinate system 21, while the reference coordinates RK of the stationary calibration region 22 are defined in a stationary so-called global coordinate system 24.

The deviations of the actual work poses 26' from the nominal work poses 26 depend on a plurality of influence factors. The important outer influences, in addition to the environmental temperature, include first of all impact loads which are caused by collisions with bodies reaching the movement region of the processing device 2. In addition, friction-related wear of the processing device leads to the situation that the clearance in the various bearings is increased which significantly influences the movement course of the processing device 2 and thereby reaching the work positions of the work unit 15 which are determined by the different coordinates K, RK. Since the wear significantly depends on the movement of the processing device 2, it is desirable to perform the inventive method in dependence on time in regular or irregular intervals, which can mean preferably operation hours or fixed time intervals. Furthermore, it can be also desirable to perform the inventive method always when the processing device had increased impact loads, for example due to collisions or the processing device 2 is subjected to high temperature fluctuations. The temperature fluctuations can be determined on the one hand by variations of the environmental temperature and on the other hand by the operation-caused heating of the processing device 2.

For performing the inventive method in a short time for efficiency purposes, the reference coordinates RK can represent only a part of the work points 27, 28 determined by the coordinates K of the work regions 17–20, so that the adjusting processing is limited to this selection of the work points 27, 28. For example, with interpolation it is possible to determine in a computerized way a plurality of further work points 27, 28 in the computation and control unit 14 in a faster and precise manner without the need of a position change of a processing device 2.

As mentioned above, the calibration region 22 is formed by a caliber plate 23 and the horizontal and vertical inclination of the caliber plate 23 correspond to the horizontal and vertical inclinations of the work regions 17–20. Therefore the processing device 2 with the processing head 2 associated therewith assumes approximately the same work poses 26 in the region of the caliber plate 23 as well as in the work regions 17–20.

As illustrated, the caliber plate 23 can be provided by a grid of reference points 29, wherein the work points 27, 28 which do not coincide with the reference points 29 can be determined by interpolation. The arrangement of a grid of reference points 29 has in particular the advantage that great work regions 17–20 can be represented by a single calibration unit 22. The calibration process can be limited depending on the work points 27, 28 to completely predetermined regions 30 of the calibration region 22, so that it is always guaranteed that with work points 26, 28 which are significantly spaced from one another, the processing device 2 during the calibration process assumes the work poses 26 which correspond to the work poses in the work regions 17–20.

In accordance with a further embodiment of the present invention, the caliber plate 23 is displaceable in horizontal and vertical directions without an inclination change. Therefore on the one hand it is usable on different processing devices 1, 2 and in addition can be utilized in a favorable outside conditions on the same processing device 1, 2 for example in a protected position. For providing the possibility of adapting the caliber plate 23 further to differently positioned work regions 17–20, the caliber plate 23 can be changed in its inclination in correspondence with directions of arrows 31, 32. The inclination change is performed so that the new work regions 17–20 and the new calibration region 22 have again the same inclination, so that the processing device 2 and the processing head 10 associated with it assume approximately the same work poses 26 both during running over the work regions 17–20 and during running over the calibration region 22.

The reference points 29 in the simplest case can be provided as openings 34 or socket pins 35. Thereby the sensor 33, which is connected with the computation and control unit 33 and arranged in the processing head 10 of the processing device 2, can scan the reference points 29 in a simple manner. The reference points 29 can be also formed by reflecting points 36 on the caliber plate 23 to keep the expenses for providing the reference points 29 and the caliber plate 23 as low as possible. The reflecting points 36 can be detected for example by an optical sensor 33.

It will be understood that each of the elements described above, or two or more together, may also find a useful application in other types of constructions differing from the types described above.

While the invention has been illustrated and described as embodied in method of and apparatus for operating a work robot, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:

1. A method of operating a multi-axes processing device with an associated processing head for improving its position accuracy, comprising the steps of controlling a position change of the processing device and the associated processing head with a computer; arranging a work region and a calibration region so that the work region and the calibration region occupy a same or similar position in space by a same or similar inclination in horizontal and vertical directions, and reference coordinates of the calibration region correspond to coordinates of the work region, and the processing device and the associated processing head during running through the work region and through the calibration region move in accordance with the coordinates of the work region or the reference coordinates of the calibration regions, and assume work poses which are same or similar work poses; detecting actual work poses of the processing device and the associated processing head and determining presence or absence of deviations of the actual work poses from nominal work poses; and in the event of presence of the deviations, moving the processing device and the associated processing head into the calibration region and post-adjusting the work poses.

2. A method as defined in claim 1, wherein said detecting and if necessary pose-adjusting includes comparing coordinates of the work region of the at least one processing head with reference coordinates of a calibration region.

3. A method as defined in claim 2; and further comprising defining the coordinates of the work region in a co-moving coordinate system, and defining the reference coordinates of the calibration region for at least one work pose in a stationary global coordinate system.

4. A method as defined in claim 2; and further comprising storing the coordinates of the work region and the reference coordinates in the calibration region in the computation and control unit of the processing device.

5. A method as defined in claim 2; and further comprising performing a calibration step in time intervals selected from the group consisting of regular time intervals and irregular time intervals.

6. A method as defined in claim 5; and further comprising performing the calibration processing depending on predetermined parameters selected from the group consisting of time, temperature changes, impact loads, and combinations thereof.

7. A method as defined in claim 2; and further comprising forming the work region so that it includes a plurality of work points; representing by the calibration region a selection of the work points as reference points; and determining the coordinates of the work points represented in the calibration region not by reference points but instead but interpolation in a computerized way.

8. An apparatus for operating a multi-axes processing device having an associated processing head, comprising means for controlling a position change of the processing device with the associated processing head with a computer; means for arranging a work region and a calibration region so that the work region and the calibration region occupy a same or similar position in space by a same or similar inclination in horizontal and vertical directions, and reference coordinates of the calibration region corresponds to coordinates of the work region, and the processing device and the associated processing head during running through the work region and through the calibration region move in accordance with the coordinates of the work region or the reference coordinates of the calibration region, and assume work poses which are same or similar work poses; means for detecting actual work poses of the processing device and the associated processing head and determining presence or absence of deviations of the actual work poses from nominal work poses; and means for moving the processing device and the associated processing head into the calibration region and post adjusting the work poses, in the event of presence of the deviations.

9. An apparatus as defined in claim 8, wherein said means for detecting and if necessary post-adjusting is formed so that coordinates of a work region of the processing head are compared with reference coordinates of a calibration region.

10. An apparatus as defined in claim 9, wherein said means for comparing and if necessary post adjusting includes a calibration plate which forms the calibration region representing the working region and having a plurality of reference points, wherein the reference points is a selection of work points defined in the work region.

11. An apparatus as defined in claim 10, wherein a position of the caliber plate is adapted to a position of the work regions so that the processing device and associated processing head assume in a region of the caliber plate and in the work region substantially same work poses.

12. An apparatus as defined in claim 10, wherein the reference points on the caliber plate are formed as a flat grid so that actual work coordinates of the processing device located between the reference points are determined by interpolation.

13. An apparatus as defined in claim 10, wherein a distance from the caliber plate to the work region is changeable in a direction selected from the group consisting of a horizontal direction, a vertical direction, and both, while a relative position to the work poses of the processing device is substantially maintained.

14. An apparatus as defined in claim 10, wherein an inclination of the caliber plate is adaptable to an inclination of the work region.

15. An apparatus as defined in claim 10, wherein the reference points of the calibration plate are formed as elements selected from the group consisting of openings and pins; and further comprising a sensor which is connected with the computation and the control unit of the processing device and senses the elements.

16. An apparatus as defined in claim 15, wherein the sensor is a component of the processing head of the processing device.

17. An apparatus as defined in claim 10, wherein the reference points of the calibration plate are formed as reflecting points; and further comprising a sensor connected with the computation and control unit of the processing device and sensing the reflecting points.

18. An apparatus as defined in claim 17, wherein said sensor is a component of the processing head of the processing device.

19. An apparatus as defined in claim 18, wherein the processing device includes a plurality of the processing heads.

* * * * *